United States Patent

[11] 3,563,295

[72] Inventor Dean R. Hough
Pittsburgh, Pa.
[21] Appl. No. 729,259
[22] Filed May 15, 1968
[45] Patented Feb. 16, 1971
[73] Assignee Washington Rubber Company
Washington, Pa.

[54] VEHICLE TIRE CONSTRUCTION AND METHOD OF MAKING SAME
6 Claims, 8 Drawing Figs.

[52] U.S. Cl. .................................................. 152/361;
152/358
[51] Int. Cl. .................................................. B60c 9/10
[50] Field of Search ...................................... 152/330, 361, 153, 358

[56] References Cited
UNITED STATES PATENTS

| | | | |
|---|---|---|---|
| 2,007,825 | 7/1935 | Day | 152/153 |
| 2,083,003 | 6/1937 | Budd | 152/358 |
| 2,770,282 | 11/1956 | Herzegh | 152/330 |
| 3,024,827 | 3/1962 | Hough | 152/330 |

Primary Examiner—James B. Marbert
Attorney—William J. Ruano

ABSTRACT: A method of providing a direct and very short venting path for the cord plies normally built into the carcass of a pneumatic vehicle tire, comprising applying a net of cord onto the inner surface of a camel-back strip while still in hot, plastic condition, projecting circumferentially spaced strands of said net through the thickness of the tread layer, and finally applying the composite tread and net onto the buffed worn surface of the tire in a manner so that certain strands of the net contact the ply layers of cord of the tire carcass.

INVENTOR.
DEAN R. HOUGH
BY
his ATTORNEY

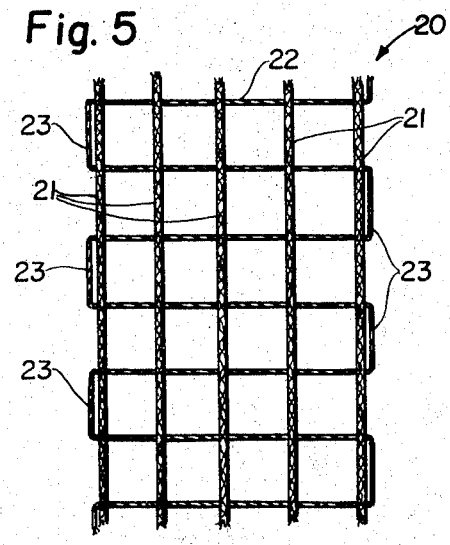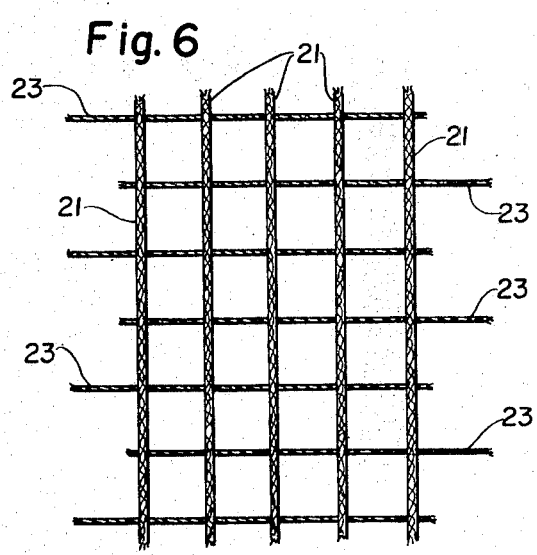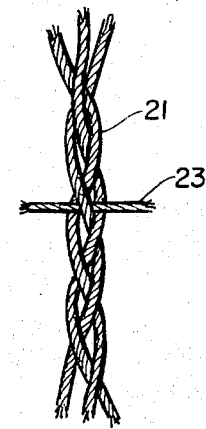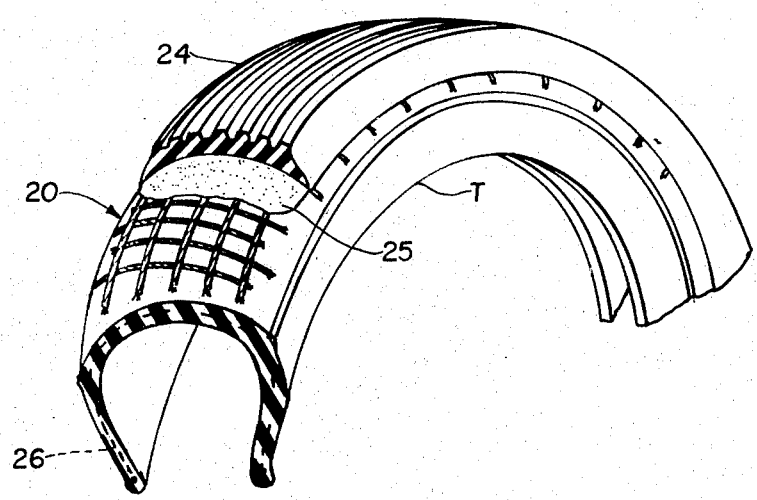

VEHICLE TIRE CONSTRUCTION AND METHOD OF MAKING SAME

This invention relates to a vehicle tire construction and method of making the same and is an improvement over my Pat. No. 3,024,827 dated Mar. 13, 1962.

A disadvantage in the cord arrangement shown in said patent is that the venting cords must be psssed laterally through the shoulder portions, which are comparatively thick compared to the remainder of the tread, before venting through the sidewalls of the tire, thus necessitating a long venting path.

An object of my invention is to provide a novel vehicle tire construction and method of making the same for new tires or for the recapping of an existing worn tread.

A more specific object of the invention is to provide a novel cord construction and method of applying it to a vehicle tire tread so as to vent the cords directly through the thickness of the tread of minimum dimension as compared to the shoulder portions, so as to provide a very short and direct venting path between the main cord pies of the tire and the road contacting surfaces of the tread layer.

A more specific object of the invention is to provide a novel method of wrapping a cord net around the worn existing plies of a tire carcass and projecting portions of the net so as to penetrate the thickness of tread rubber or camel-back used for recapping to provide the shortest airpath between the ply layers of cord and the tread surface of the tread layer so as to prevent the formation of air pockets between the pies and the tread layer which might otherwise cause tread separation and its attendant danger of a blowout.

Other objects and advantages will become more apparent from a study of the following description, taken with the accompanying drawing wherein:

FIG. 5 is a fragmentary, enlarged view of a modification of the cord net;

FIG. 6 shows the cord net of FIG. 5 after the side strands are cut;

FIG. 7 is an enlarged, fragmentary view of one of the strands 21 of FIG. 5 illustrating how a cross strand is passed therethrough; and, FIG. 8 is a fragmentary view of a tire showing the net of FIG. 6 for venting air through the sidewalls of tire T.

Figure 2:
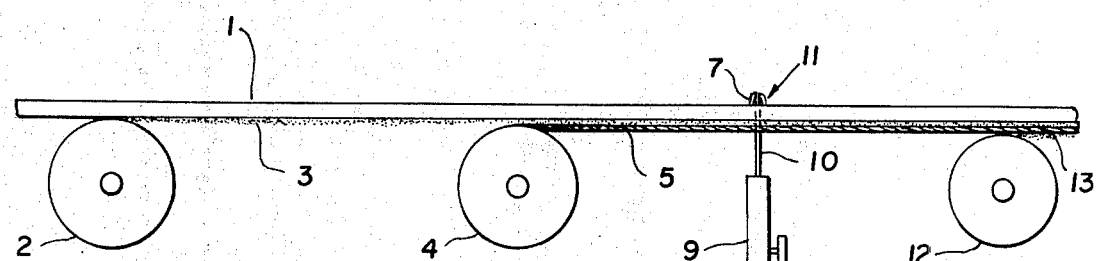
FIG. 2 is a side elevational view of apparatus for projecting longitudinally spaced portions of the central cord of FIG. 1 through the thickness of the tread layer.
Figure 1:
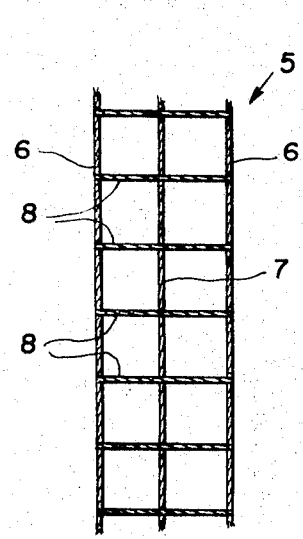
FIG. 1 is a fragmentary, plan view of a cord net portion adapted to be encircled about the peripheral surface of a worn tire.

Referring more particularly to FIG. 2 of the drawing, numeral 5 generally denotes a fragmentary portion of a long length of tread rubber or camel-back onto which a cushion gum layer is adhered by a roller 2, to which layer 3 there is adhered a strip of netting or a net generally denoted by numeral 5 (FIG. 1.). The net is preferably made of cotton cord, or other fibrous cord, particularly multifilar cord twisted about its own axis. The central cord 7 is preferably of stretchable material, such as cords composed partly of rubber or synthetic rubber, such as those wherein the rubber is spirally wrapped about the strands of cotton cords (or vice versa). In certain instances, the entire netting is made of stretchable material, or perhaps of only highly twisted cotton cord that is stretchable in length.

Figure 3:
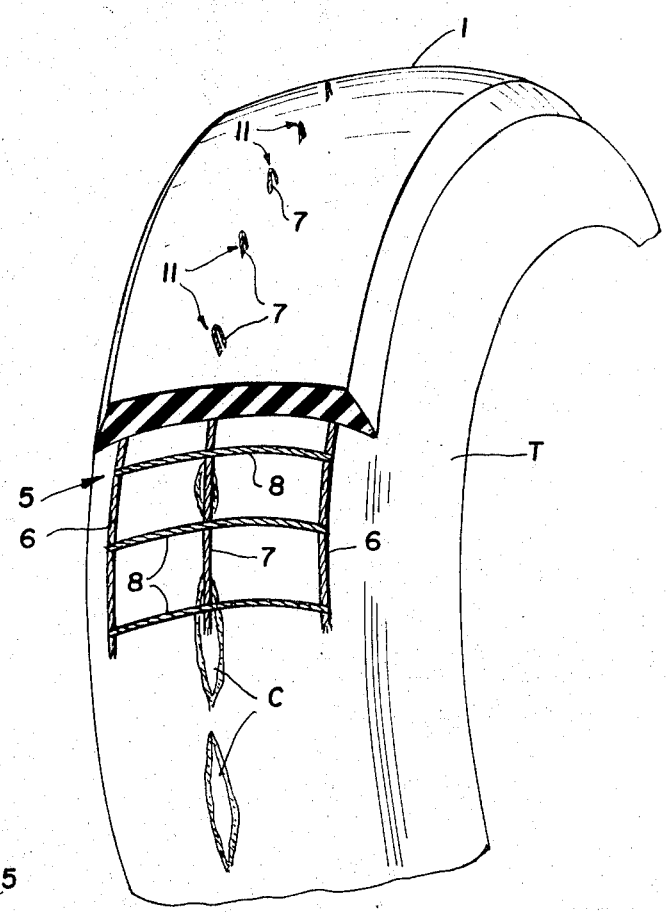
FIG. 3 is a fragmentary, perspective view of a tire that is being recapped with the combined cord net and camel-back strip illustrated in FIG. 2.

As will appear more clearly from FIG. 3, the net 5 is placed on a buffed surface of a worn tire T, such as one having skives or worn areas C exposing the ply or cord layers of the tire carcass. Thus direct contact is made between the built-in cord plies of the tire and strands 7 and 8 of the net 5. The outer strand 6 of the net may be of stretchable cord as described previously to enable a tight fit or grip of the net onto the buffed surface. The skives C may be purposely made to insure proper contact between the main cord body or plies of the tire and net 5 and may penetrate one or two plies of the cord layers of the tire carcass. The tire is then cemented and the cord or net 5 is applied. But before the tread rubber 1 is applied, the skives must be filled with a strip rubber, sometimes called tread strips, cushion gum or stripping stock. The fill-in rubber is put into the repair area after the central strand 7 of the net is moved in place directly through the center of the skived area.

This is done by the apparatus illustrated in FIG. 2 wherein a continuous extruded layer of tread stock 1, while in heated or plastic form, is coated with cushion gum 3, whereas the roller 4 applies, on the outer surface of cushion gum 3, a layer of cord net 5. As the strip 1 is moving with the adhered cord layer 5 thereon, an eccentrically driven or vertically reciprocated plunger 9 is adapted to reciprocate a needle 10, having a bifurcated end for seating a portion of the central strand 7, as show shown on the top of FIG. 3, and push spaced portions 11 of the central strand 7 through the thickness of tread rubber 1 to provide an airpath through the cord layer or camel-back 1. Similarly, the side strands 6 could be projected through the thickness of the tread layer, if desired. Likewise additional intermediate strands may be inserted between strands 6 and 7 if desired, and running parallel thereto which may also have portions projected through the thickness of the camel-back 1. Roll 12 applies poly layer 13.

Thus there is continuity of the air venting path from the basic tire plies through the net 5, thence through the thickness of the tread rubber so as to emerge at the tread surface of the camel-back. Such surface may then be molded to provide the desired tread design.

Figure 4:
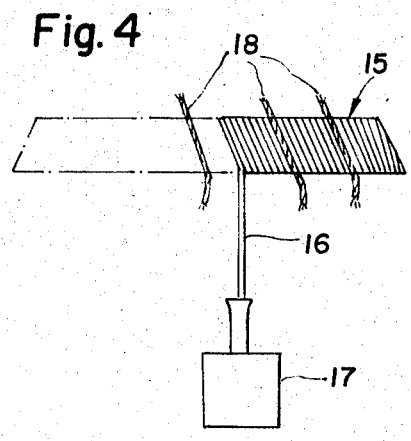
FIG. 4 is a top, plan view showing a modified method of building up a recapping tread layer or camel-back by composite extruded strips sandwiched with cord portions.

FIG. 4 schematically illustrates a method for building up a tread layer or camel-back by extruding a thin strip 16 from an extruding head 17, which strip is spirally wound in a peripheral path about the circumference of the tire. The thickness of the tread is determined by the angle at which portions 16 are applied to enable selective adjustment of the thickness of the tread. Portion 16 may be of the order of 1/16 to ⅛ inch in thickness, whereas the thickness of the tread layer 15 may be of the order of 1 inch. In building up the tread layer of this type, strands of cord 18 may be laid alongside one or more layers of the tread so as to provide the air venting path through the thickness of the tread. Strands 18 may be merely laid onto the side of extruded strip 16, which is tacky, and thus fed into position between the tread rubber strands. As shown in FIG. 4, cord strands 18 projecting from the inside surface of the tread 15 are adapted to lie on and contact each other as well as the net 5, forming a base therefor, and the skives C so as to assure air venting paths extending from the basic cord layers, through skives C, net 5, and thence through the thickness of the tread.

As a further modification of the construction shown in FIG. 3 the side strands 6 may also be projected through the thickness of the tread layer 1 much the same way as the projections 11 to provide more parallel paths to the outside surface of the tread layer.

FIG. 5 shows a modification of the cord net 20 embodying five longitudinally extending multifilar cords 21 through which there is laterally woven, in sinusoidal pattern, cross cords 22, 23. As shown more clearly in FIG. 7, illustrating an enlarged, fragmentary portion of cord 21, it will be noted that cord 21 is in form of woven, multifilar cotton strands and that cross cord 22 or 23 is merely passed through the strands thereof and held thereto by friction.

The net arrangement shown in FIG. 5 may be substituted for that shown in FIG. 1 and 3. In some instances, however, it may be desired to vent the net 20 through the sidewalls of the tire in a manner shown in FIG. 8. FIG. 8 shows a tire T having one or more original plied layers 26 which are brought into direct contact, through buffed areas such as C shown in FIG. 3, with the net 20, which net is covered by cushion gum 25 of the camel-back or tread 24.

FIG. 6 shows how the net 20 appears after the end strands 23 are cut in order to allow venting through the sidewalls, in the manner shown in FIG. 8. Thus the net 20 of FIG. 5 may be selectively used either as shown in FIG. 3 or in FIG. 8. It may even be vented through both the tread, as shown in FIG. 3, and the sidewalls, as shown in FIG. 8, if desired. Net 20, as shown in FIG. 5, is preferably made of very long lengths and wrapped into the form of a large spool so that, depending upon the tire size, a suitable length may be cut to encompass the entire periphery. The side strands may be made stretchable by forming them partly or rubber strands and/or by twisting them spirally. The intermediate longitudinal strands may also be made stretchable by the use of strands of rubber or other elastic material or by highly twisting the cotton yarns.

Thus it will be seen that I have provided an efficient cord net design and method for applying the cord net to tires which have been worn so as to provide a direct venting path extending from the carcass ply layers through the thickness of the tread layer or camel-back to the road contacting surface thereof, thereby providing the most direct path and the shortest distance possible for venting and thereby assuring that no air pockets will form between the buffed worn surface of the tire and camel-back which might otherwise cause separation of the camel-back, particularly after such air pockets increase in volume as a consequence of heat, as occurs when driving at high speeds on a highly heated highway in midsummer.

While I have illustrated and described several specific embodiments of my invention, it will be understood that these are by way of illustration only, and that various changes and modifications may be made within the contemplation of my invention and within the scope of the following claims.

I claim:

1. A tire construction comprising a carcass having ply layers of cord, a tread strip including on its inner surface a net of cord extending about the entire periphery of the tire and in contacting relationship with at least one of said ply layers, a plurality of strands of said net extending in circumferentially spaced relationship through the entire thickness of the said tread strip so as to provide a short and direct venting path from said ply layers and said net of cord to the outside surface of said tread layer so as to prevent separation of the tread layer from said carcass.

2. A tire construction as recited in claim 1 wherein said net includes a central, circumferentially extending strand which is stretchable sufficiently to enable projection of the strands through the entire thickness of the tread.

3. A tire construction as recited in claim 1, wherein said tread is made of up of thin strands of rubber spirally wound about the circumference of the tire in side-by-side relationship and wherein cord layers of said net are sandwiched between certain of said thin strands of rubber to provide multiple air-venting paths through said tread.

4. A tire construction comprising a carcass having ply layers of cord and a tread rubber layer, a net of cord between said tread rubber layer and carcass, said net being connected to certain of the cords of said ply layers of cord so as to provide an air ventilating path therebetween, and a plurality of air-venting cords extending throughout the entire thickness of said tread rubber layer and being transversely and circumferentially spaced from one another and connected to said net so as to provide a multiplicity of air-venting paths from said net to the outer surface of said tread rubber layer.

5. A tire construction as recited in claim 4 wherein said net of cord comprises a plurality of spaced, parallel multifilar strands surrounding the periphery of the tire, and a sinuously wound strand extending transversely thereof and passing through said multifilar strands and frictionally held thereby, portions of said sinuously wound strands extending alongside the outer portion of said peripherally spaced multifilar strands.

6. A tire construction as recited in claim 5 wherein said outer portions of said sinuously wound strands are cut and project outside the tire sidewalls to provide venting terminals thereat.